(12) United States Patent
Olbrich

(10) Patent No.: US 6,581,267 B1
(45) Date of Patent: Jun. 24, 2003

(54) VIBRATION CANCELER

(75) Inventor: Andreas Olbrich, Mossautal (DE)

(73) Assignee: Firma Carl Freudenberg, Weinheim (DE)

( * ) Notice: Subject to any disclaimer, the term of this patent is extended or adjusted under 35 U.S.C. 154(b) by 1052 days.

(21) Appl. No.: 08/607,738

(22) Filed: Feb. 27, 1996

Related U.S. Application Data

(62) Division of application No. 08/308,246, filed on Sep. 19, 1994, now abandoned.

(30) Foreign Application Priority Data

Aug. 10, 1993 (DE) .......................................... 43 34 316

(51) Int. Cl.$^7$ ................................................. B23P 11/02
(52) U.S. Cl. ............................ 29/450; 29/235; 464/89; 464/92
(58) Field of Search .......................... 29/451, 235, 450; 74/574; 403/371; 464/180, 182, 89, 92, 160

(56) References Cited

U.S. PATENT DOCUMENTS

| | | | | | |
|---|---|---|---|---|---|
| 1,959,254 A | * | 5/1934 | Zerk | ............................ | 29/235 |
| 2,008,772 A | * | 7/1935 | Robertson | .................... | 29/235 |
| 2,052,448 A | * | 8/1936 | Colaert | ........................ | 29/451 |
| 2,572,215 A | * | 10/1951 | Swart | ........................... | 29/235 |
| 3,407,627 A | * | 10/1968 | Lätsch et al. | ................ | 464/182 |
| 4,748,060 A | * | 5/1988 | Fry et al. | .................... | 138/151 |
| 5,123,453 A | * | 6/1992 | Robbins | ...................... | 138/149 |

* cited by examiner

Primary Examiner—David P. Bryant
(74) Attorney, Agent, or Firm—Kenyon & Kenyon

(57) ABSTRACT

A vibration canceler for a shaft rotating about an axis, including an inertial ring which is fastened to the shaft in a relatively twistable manner by at least one elastic ring made of a rubber-like material. The elastic ring contacts the outer circumference of the shaft in a directly abutting manner and is untwistably pressed on to the shaft by the inertial ring.

2 Claims, 3 Drawing Sheets

VIBRATION CANCELER

RELATED U.S. PATENT APPLICATIONS

The present application is a division of U.S. patent application Ser. No. 08/308,246, filed on Sep. 19, 1994, now abandoned, by Andreas OLBRICH, entitled "Vibration Canceler."

BACKGROUND OF THE INVENTION

1. Field of the Invention

The present invention concerns a vibration canceler for a shaft rotating about an axis. The vibration canceler includes an inertial ring which is fastened to the shaft in a relatively untwistable manner by at least one elastic ring made of a rubber-like material.

2. Description of the Prior Art

A vibration canceler is shown in DE-PS 588 245. The elastic ring in the vibration canceler shown in that publication is fastened to a hub ring and joined by this hub ring to the shaft. This arrangement increases the cost of manufacturing such a rotational vibration canceler and makes it more difficult to assemble the vibration canceler.

BRIEF DESCRIPTION OF THE INVENTION

The underlying object of the present invention is to provide a vibration canceler for a shaft rotating about an axis which can be manufactured and assembled in a simple manner.

In the vibration canceler according to the present invention, the elastic ring contacts the outer circumference of the shaft by direct abutment and is untwistably pressed on to the shaft by the inertial ring. The relative displacements of the inertial ring which occur during normal use are due exclusively to elastic deformation of the elastic ring itself. The surfaces bounding the elastic ring on both the inside and the outside contact, in a fully immovable manner, the contacting surfaces of the shaft on one side and the inertial ring on the other side. By eliminating the hub ring, manufacture and assembly of the vibration canceler according to the present invention are much simpler than in previously known vibration cancelers. Nonetheless, features equivalent to known vibration cancelers are obtained.

The elastic ring can be provided with a split at one or more circumferential location, which simplifies assembly in applications where the shaft to be equipped has enlargements on both ends, which enlargements have an outer diameter greater than the inner diameter of the elastic ring. The inertial ring can be slid over the enlargement of the shaft onto the preinstalled elastic ring. Immovable pressing of the elastic ring on to the outer circumference of the shaft arises as a result. It is also possible to use a divided inertial ring which is slid on to the preinstalled elastic ring in a direction transverse to the shaft and fastened thereupon by joining together the segments which form the inertial ring. The elastic ring as well as the inertial ring can consist of more than two partial segments if need be.

According to an advantageous embodiment, the elastic ring is bonded to the shaft and/or the inertial ring. In such an embodiment, it is no longer necessary to use a very large contact pressure to obtain an immovable contact. Such a variant is very advantageous in particular with regard to the reduction of vibrations at a comparatively low frequency.

A particularly secure anchoring can be achieved in the vibration canceler according to the present invention if the elastic ring, the shaft and/or the inertial ring are provided at one or more locations in the region of the mutually contacting surfaces with a mutually engaging, relief-like surface structuring. The usage of a secondary adhesive is frequently unnecessary in such an embodiment. Nonetheless, proper fastening is achieved while avoiding high contact pressure.

A method for manufacturing the vibration canceler according to the invention in which, in succession, the elastic ring is fastened to the shaft and the inertial ring is then fastened to the elastic ring, for example, in the course of successively mounting in their final position the hollow cylindrical parts which make up the elastic ring and the inertial ring, has proven particularly advantageous. A lubricant can be used if necessary. The reverse order of assembly can naturally be used as well and is recommended as more advantageous under certain circumstances.

In a method for manufacturing the vibration canceler in which the elastic ring is bonded to the shaft and/or the inertial ring, it has proven advantageous if an adhesive in micro-encapsulated form is used for bonding purposes and is applied to the surface zones to be bonded before the individual parts are assembled. The micro-capsules containing the adhesive are dry on the outside such that a bonding procedure can be performed in a very clean manner. The mutual pressure which arises when the surfaces to be bonded are brought together results in the destruction of the micro-capsules so that the adhesive contained therein is activated. This takes place directly between the surfaces to be bonded and produces a solid, mutual bond between them.

BRIEF DESCRIPTION OF THE DRAWINGS

The invention is further explained hereafter based on the drawings.

DETAILED DESCRIPTION OF THE DRAWINGS

Figure 1:
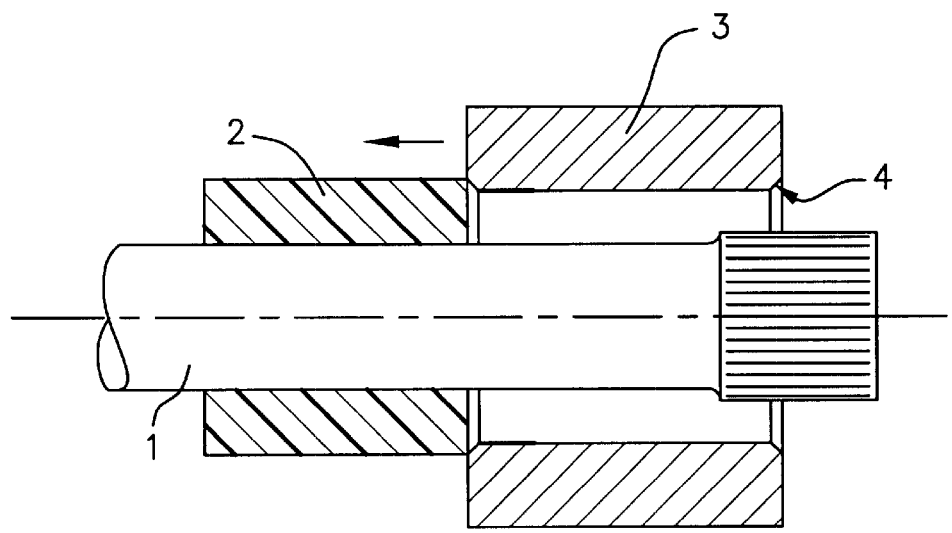
FIGS. 1 and 2 illustrate the assembly of a first embodiment of the vibration canceler according to the present invention, before and after assembly, respectively.
Figure 2:
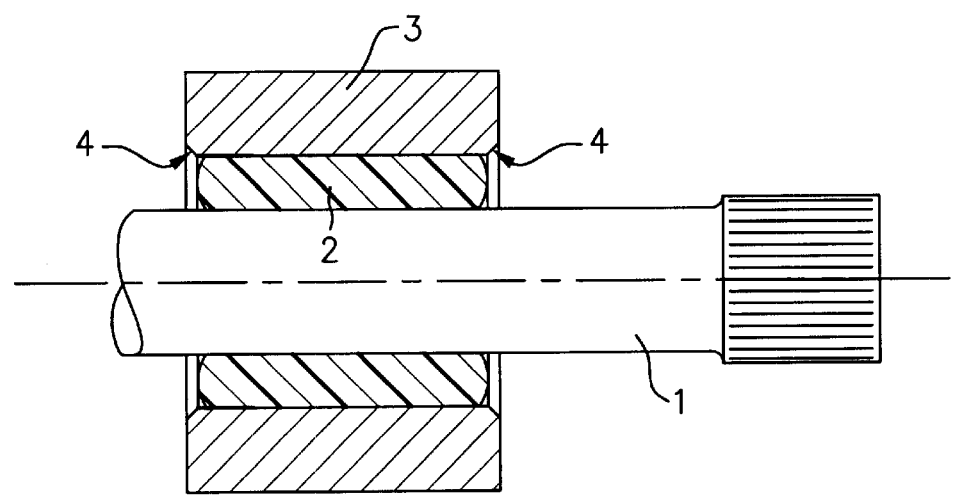

FIGS. 1 and 2 illustrate the assembly of a first embodiment of the vibration canceler according to the present invention fitted onto the outer circumference of a shaft 1 which can be rotated about an axis. The elastic ring 2 made of rubber or another elastomeric material is first fastened to the outer circumference of the shaft 1. If necessary, the elastic ring can be provided with a split 5 (FIG. 4) at one or more circumferential locations, which allows the elastic ring 2 to be mounted on to the outer circumference of the shaft 1 in a direction transverse to the axis of the shaft. Subsequently, the inertial ring 3 is slid on to the elastic ring 2 over the enlarged end of the shaft 1, as shown in FIG. 2. Inertial ring 3 can include chamfering 4 to assist in assembly on elastic ring 2. A solid, radial pressing of the cross-section of the elastic ring 2 between the inner circumference of the inertial ring 3 and the outer circumference of the shaft 1 thus arises. The surface zones of the elastic ring 2 which contact the shaft 1 on one side and the inertial ring 3 on the other side are immovable with respect to the respective bordering regions of shaft 1 and inertial ring 3. The relative displacements of the inertial ring 3 with respect to the shaft 1 which arise upon introduction of extensional and/or rotational vibration are absorbed exclusively by elastic deformation of the elastic ring 2. If need be, the elastic ring can be bonded to the shaft 1 as well as to the inertial ring 3.

Figure 3:
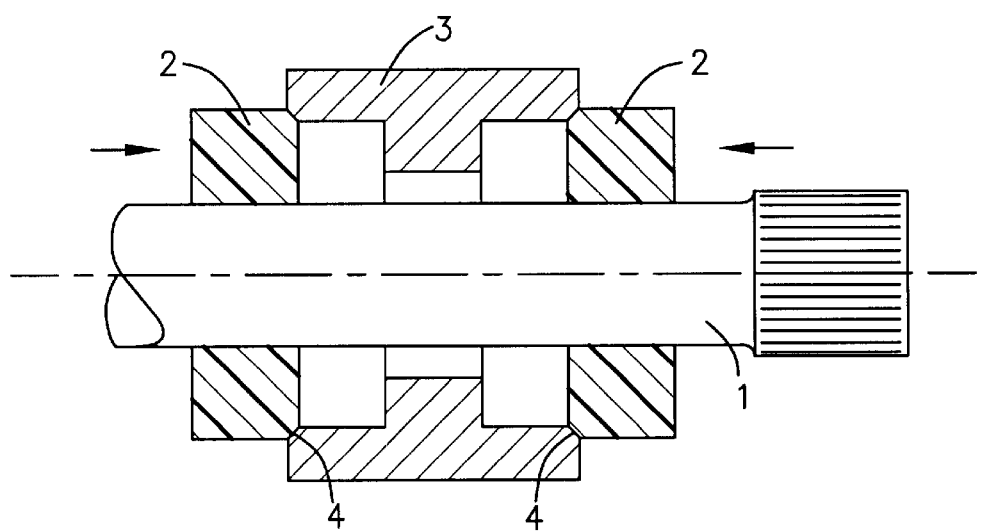
FIG. 3 illustrates the assembly of a second embodiment of the vibration canceler according to the present invention.

FIG. 3 illustrates the assembly of a second embodiment of the vibration canceler in which the inertial ring 3 is first aligned with the shaft 1. Subsequently, two elastic rings 2 are forced in a direction opposite one another into the cutouts which open in an axial direction between the inertial ring 3 and the shaft 1, the desired elastic supporting of the inertial ring 3 on to the shaft 1 arising in this manner. The forces used to apply the elastic rings 2 neutralize one another during insertion of the elastic rings 2. Assembly of a vibration canceler of this sort is thus very simple.

Figure 4:
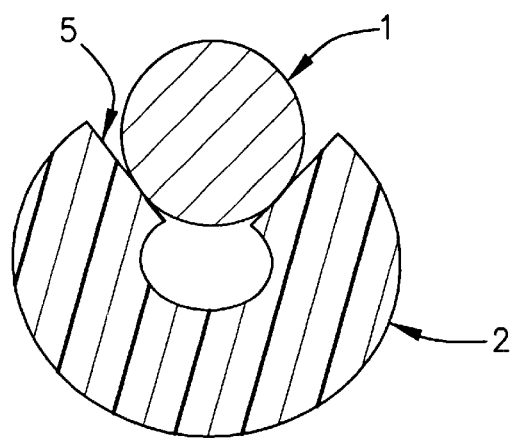
FIG. 4 illustrates the elastic ring of the present invention including a split.

FIG. 4 shows a cross-sectional view of the shaft 1 and elastic ring 2 in which the elastic ring 2 has a split 5, allowing elastic ring 2 to be assembled onto shaft 1 in a direction transverse to the axis of shaft 1. As seen in FIG. 4, split 5 is opened so that elastic ring 2 may be fit circumferentially around shaft 1.

Figure 5:
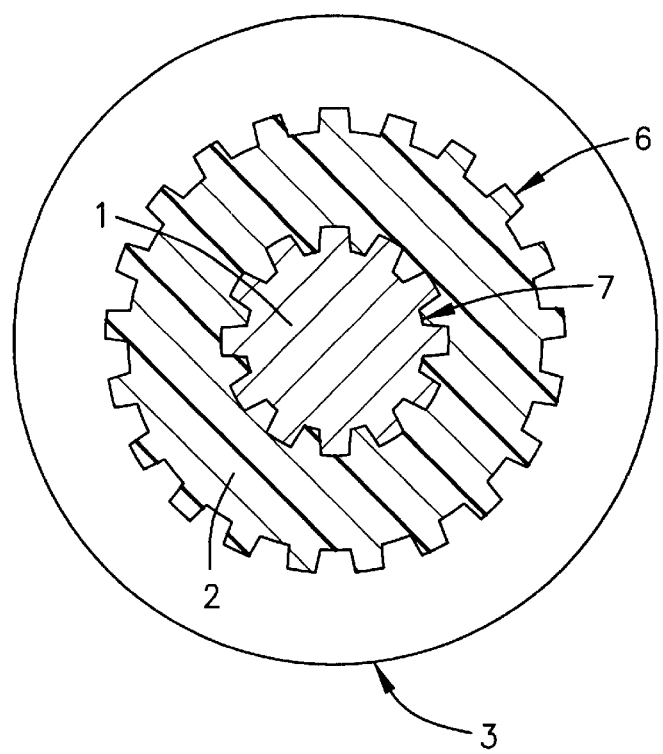
FIG. 5 illustrates the elastic ring and the inertial ring of the present invention including relief-like surface structuring.

FIG. 5 shows a cross-sectional view of shaft 1, elastic ring 2, and inertial ring 3 in which each of these elements has mutually engaging relief-like surfaces 6, 7. These surfaces bond shaft 1 to elastic ring 2 and elastic ring 2 to inertial ring 3, such that these elements do not rotate relative to one another. The same result may be accomplished using adhesive bonding between these elements.

What is claimed is:

1. A method for manufacturing a vibration canceler comprising the steps of:

sliding at least one elastomeric ring onto a shaft, wherein said step of sliding said at least one elastomeric ring onto said shaft comprises sliding said at least one elastomeric ring in a direction transverse to an axis of said shaft; and sliding an inertial ring onto an outer circumference of said at least one elastomeric ring, after said step of sliding said at least one elastomeric ring onto said shaft, so that said inertial ring does not contact said shaft.

2. The method of claim 1, further comprising the steps of:

lubricating said shaft prior to said step of sliding said at least one elastomeric ring onto said shaft; and lubricating said outer circumference of said at least one elastomeric ring prior to said step of sliding said inertial ring onto said outer circumference of said at least one elastomeric ring.

\* \* \* \* \*